United States Patent [19]

Helmberger et al.

[11] 4,007,489
[45] Feb. 8, 1977

[54] METHOD AND APPARATUS FOR CREATING COLOR COPIES OF AN ORIGINAL BY AN ELECTROSTATIC CHARGING PROCESS

[75] Inventors: Josef Helmberger; Wolfgang Ruf, both of Munich, Germany

[73] Assignee: AGFA-Gevaert, A.G., Leverkusen, Germany

[22] Filed: Sept. 19, 1975

[21] Appl. No.: 614,786

[30] Foreign Application Priority Data

Sept. 24, 1974 Germany ............................ 2445541

[52] U.S. Cl. ............................ 358/78; 178/DIG. 28; 346/157; 358/75; 358/280; 358/264
[51] Int. Cl.² ...................... H04N 1/46; H04N 1/30
[58] Field of Search ........... 358/75, 78; 346/74 EE, 346/74 ES, 74 EK; 178/6.6 A, DIG. 28; 360/76, 77

[56] References Cited

UNITED STATES PATENTS

| | | | |
|---|---|---|---|
| 3,523,158 | 8/1970 | Zaphiropoulos | 358/75 |
| 3,657,472 | 4/1972 | Taudt et al. | 358/78 |
| 3,742,129 | 6/1973 | Roberts et al. | 358/78 |
| 3,780,222 | 12/1973 | Pickstock et al. | 178/DIG. 28 X |
| 3,790,707 | 2/1974 | Valenta, Jr. | 178/DIG. 28 X |
| 3,854,005 | 12/1974 | Castrignano | 178/DIG. 28 X |
| 3,856,987 | 12/1974 | McMann et al. | 178/DIG. 28 X |

*Primary Examiner*—Richard Murray
*Assistant Examiner*—Aristotelis M. Psitos
*Attorney, Agent, or Firm*—Michael J. Striker

[57] ABSTRACT

An original is sampled line-by-line at a predetermined number of points along each line and sampling signals indicative of the density of the original in each of three colors are furnished while electrographic paper or film is transported past a first, second and third recording station. At each recording station a line of electrodes having a length exceeding the width of the copy to be made and exceeding in number the number of sampling points of the original along each line extends in a direction perpendicular to the direction of transport of the paper. A mark on the paper is sensed at each station and the deviation of the position of the mark from a desired position in the line direction determines which electrode will be used to start the recording of the line. In the direction of transport, the deviation of the position of said mark from a desired position is sensed and the start of the line recording varied in time in accordance therewith.

12 Claims, 5 Drawing Figures

METHOD AND APPARATUS FOR CREATING COLOR COPIES OF AN ORIGINAL BY AN ELECTROSTATIC CHARGING PROCESS

BACKGROUND OF THE INVENTION

The present invention relates to a method and an arrangement for creating copies of an original. Specifically, it relates to such methods and arrangements wherein the original is scanned line-by-line and sampled at predetermined points along the line. In such systems the reproduction carrier is continuously transported past a recording station at which a line of electrodes extends perpendicular to the direction of transport. The charge deposited by means of the electrodes on the reproduction carrier corresponds to the signals derived from sampling the points of the original. The so-created charge distribution is then developed causing a copy of the original to be created.

Recording systems of the above-described type are disclosed, for example, in German DT-OS No. 2,148,001 or DT-OS No. 2,231,530.

SUMMARY OF THE INVENTION

It is an object of the present invention to furnish a method and arrangement wherein it is possible to create color copies by the above-described electrostatic charging system and wherein exact superposition, that is the superposition in exact registry of a first, second and third color component image, can be achieved.

The former is achieved by providing at least three electrostatic recording systems each followed by a developing station, each being used for the recording of one color component image. The reproduction carrier is transported past the three recording stations and the color component image created at each station is superimposed on the previously recorded color components images by control of the electrodes.

In recording colored pictures the different color component images created images created at each of the recording stations must be superimposed exactly one on the other since otherwise color fringes and other color errors appear and also, because the resolution of the picture suffers if the color component images are incorrectly superimposed upon each other. Both horizontal and vertical displacement of the rasters created by the electrodes at the different recording stations can appear because of the relatively great distances between the individual stations, the variations in position of the reproduction carrier caused by tolerances in the transport means, and expansion or shrinkage of the reproduction carrier caused by the developing and fixing processes. It should be noted that herein the horizontal direction is considered the direction in which the lines of electrodes extend and in which the original is scanned, while the vertical direction is the transport direction of the reproduction carrier.

The problem of the exact registry between the first, second and third color component image is solved by affixing a mark onto the reproduction carrier, preferably at the first recording station. The mark is affixed outside of the field which will determine the copy, that is outside of the raster created by the first, second and third color component image. Additional electrodes are furnished for creating the mark. The mark is then photoelectically sensed in the subsequent recording stations.

In a preferred embodiment of the present invention, the position of the color component image in the line or horizontal direction on the reproduction carrier is controlled by determining the deviation of the position in line direction of the mark from a desired position and controlling which electrode will serve to start the recording of the line in dependence thereon.

To control the position of the color component image in the direction of transport of the reproduction carrier, the deviation of the mark in the transport direction, from a desired position is determined and the time of starting the recording varied in accordance therewith.

The novel features which are considered as characteristic for the invetion are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The preferred embodiment of the present invention will now be described with reference to the drawing.

Figure 1:
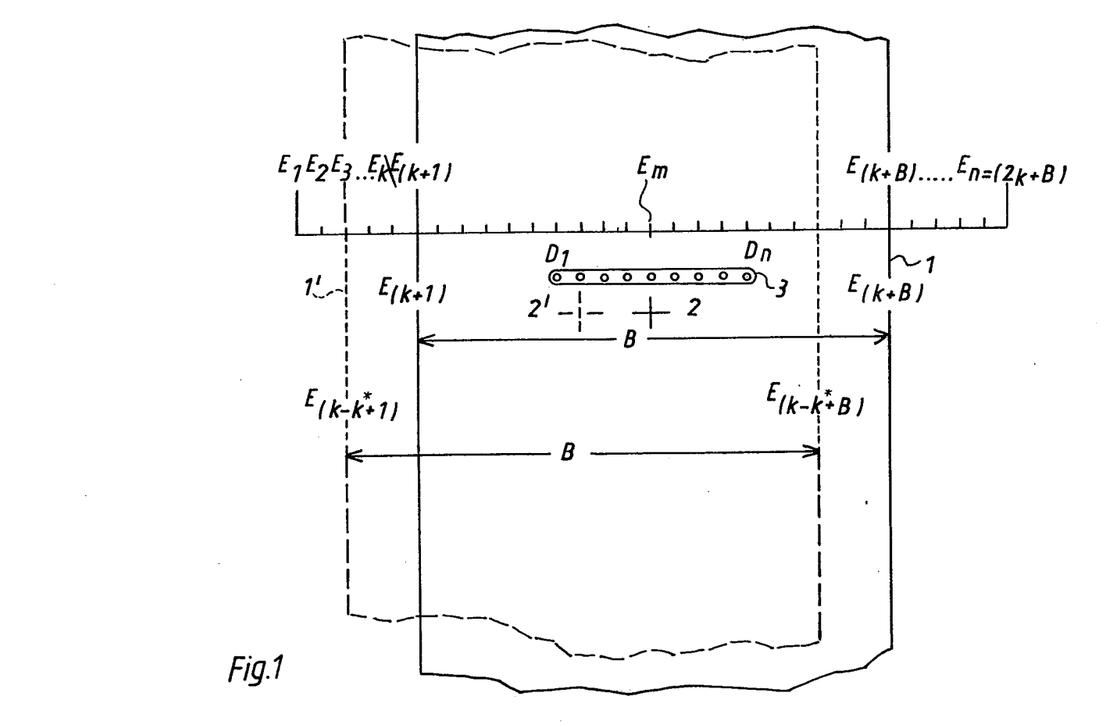
FIG. 1 is a schematic diagram showing the arrangement of the electrodes relative to the reproduction carrier at a recording station.

The reproduction carrier, namely electrographic paper or film, is transported in a direction perpendicular to the direction of the line of electrodes denoted by $E_1$, $E_2$, $E_3$, etc. The actual number of electrodes used in such a line would be much higher than that shown and, in a preferred embodiment, could be of the order of magnitude of a thousand. The width of the reproduction is indicated by the letter B. Deviations of the position of the reproduction carrier perpendicular to the direction of transport can therefore be compensated for by starting the recording of the line at a corresponding electrode. In FIG. 1, the reproduction carrier drawn in solid lines is correctly positioned, while that drawn in dashed lines is displaced by a distance corresponding to three electrodes in the left direction. Thus, for a reproduction carrier positioned as is the one shown in dashed lines in FIG. 1, the first electrode to be used for recording is the electrode $E_3$. A set of photodiodes 3 is provided in order to determine the deviation of the position of the reproduction carrier in the line direction. Other photoelectric scanning arrangements can of course be used. In any case a mark 2 or 2', for the solid or dashed line reproduction carrier respectively, is scanned and an electrical signal is furnished indicative of the deviation of the position of the mark from the desired position, as for example from the position in the center of the photodiode set. The mark on the reproduction carrier can be positioned in any desired location for example the center as shown in the figure, or else at an edge. The photoelectric sensing apparatus must of course be positioned accordingly. Further, the position of the photodiodes and the width of the mark must be such that the mark will always be sensed, that is, it must not be possible for the vertical portion of the mark to be located between two diodes without being sensed by either.

The mark can be electrographically produced by additional recording electrodes. Recording the mark in the form of a cross or an upright or inverted T is especially desirable. This type of mark requires only two electrodes. An electrode having a width of one picture element, that is of one of the electrodes in the row of electrodes, supplies the vertical portion of the mark. The horizontal portion of the mark can be supplied by a full electrode, that is an electrode which is not separated into picture element portions and which has a length corresponding to the length of the vertical portion. This electrode is energized during a single line interval only.

The adjustment of the position of the color component images in the horizontal or line direction will be discussed first. As has been previously stated, the number of electrodes, E, exceeds the number required for covering the width B of the reproduction carrier. The number of additional electrodes required varies as a function of the region over which the maximum deviation which is to be corrected will occur and as a function of the resolution of the recording system.

In the recording tube has 1 electrodes per millimeter and if the deviation of the reproduction carrier can encompass $\pm k$ picture elements, then the regulatory region is given by:

$$v_H = \pm k/1 \text{ mm.}$$

If $k = 10$ and $l = 10$ electrodes per millimeter, then a regulatory region of $$v_H = \pm 1 \text{ mm. results.}$$

For this region $2k$ additional electrodes must be furnished. The time required for activating these electrodes is $$t_H = 2 \, k/f_T,$$

when all electrdes are utilized.

Here $f_T$ is the frequency of digital control of the analog storage, that is the predetermined points along each line of the original are sampled and the resulting sampling signals are stored in the analog storage at this frequency. $t_H$ lies within the time that line blanking occurs, that is during the time that the sampling signals correspond to a lack of color. Such sampling signals are herein referred to a zero signals. It coincides partially or completely with the line retrace interval of the original.

If the reproduction carrier is in the desired position, the recording starts at electrode $E_{k+1}$. The above-mentioned zero signal is applied to electrodes $E_1, E_2, \ldots E_k$. If B electrodes per line define the width of the copy, then the recording ends at electrode $E_{k+B}$. Electrodes $E_{k+B+1} \ldots E_{2K+B}$ and all other electrodes along the line are then again activated with the zero signal. If the reproduction carrier is incorrectly positioned by $k^*$ picture elements to the left, where $k^*$ is less than $k$, then the recording starts with electrode $E_{k-k^*+1}$ and ends with the electrode $E_{k-k^*+B}$. To the right and left of these end electrodes, each electrode receives the zero signal. In the example shown in FIG. 1, $k^* = 3$. $k^*$ can of course also assume negative values. In this case the reproduction carrier has moved to the right relative to the desired position.

Figure 2:
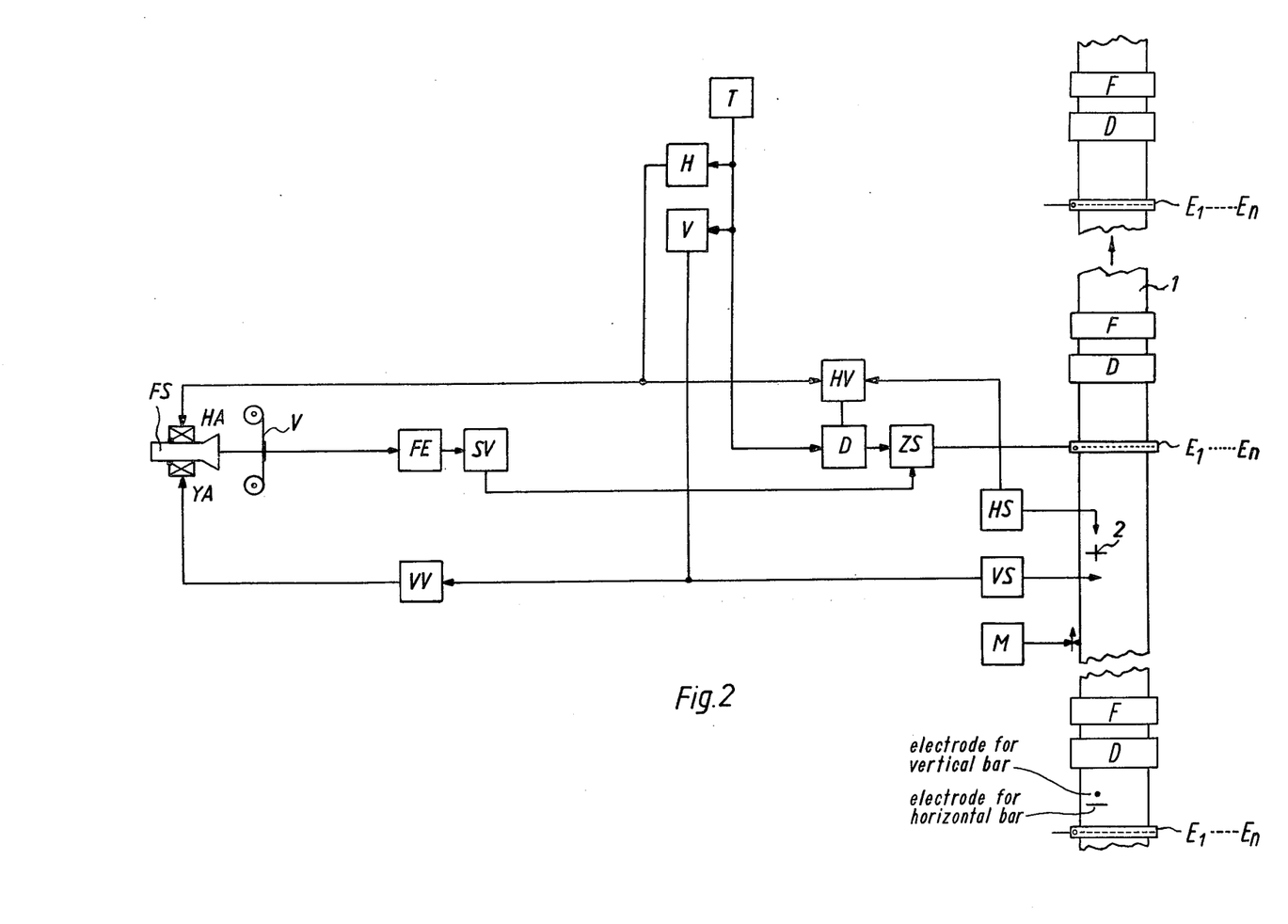
FIG. 2 is a schematic diagram showing the equipment at a recording station required to assure registry between the color component images.

FIG. 2 shows the block diagram of the equipment at a recording station. Reproduction carrier 1 is transported continuously by a motor M in the direction of the arrow. At the recording station, the scanning means for mark 2 are indicated by photoelectric scanning means HS and VS which determine the deviation of the position of the reproduction carrier in the horizontal and vertical direction respectively. Thereafter the reproduction carrier passes electrodes $E_1 \ldots E_n$ which are the recording means by which the color component image is converted into a charge distribution on the reproduction carrier 1. The color component image is electrophotographically developed in a developing station D and fixed by heating in a subsequent fixing station F. The recording station shown in FIG. 2 is followed by a similar second recording station which again starts with the scanning means for the mark.

The distance between electrodes $E_1 \ldots E_n$ of the individual recording stations is of the order of 1 meter. The color component images have to be superimposed with an accuracy of approximately 1/10 mm. The reproduction carrier is heated in the fixing station and further, deviations in the horizontal direction of the transport of the reproduction carrier can cause deviation in its position which far exceeds this allowable tolerance. Thus, the reproduction carrier must be repositioned in the horizontal position prior to each recording of a color component image, so that each color component image to be recorded is superimposed correctly onto the previously recorded color component images.

The original V is scanned in known fashion by means of a controlled beam furnished by a scanning tube FS. A photoreceiver FE causes the light signal which is modulated by the original to be transformed into an electrical signal. The resulting electrical signal is processed by a processing station SV for purposes of controlling the gradation, accentuating edges, etc. The so processed signal is then entered into a buffer storage ZS which has n individual storage locations, where the number n corresponds to the number of electrodes $E_1 \ldots E_n$.

Figure 3:
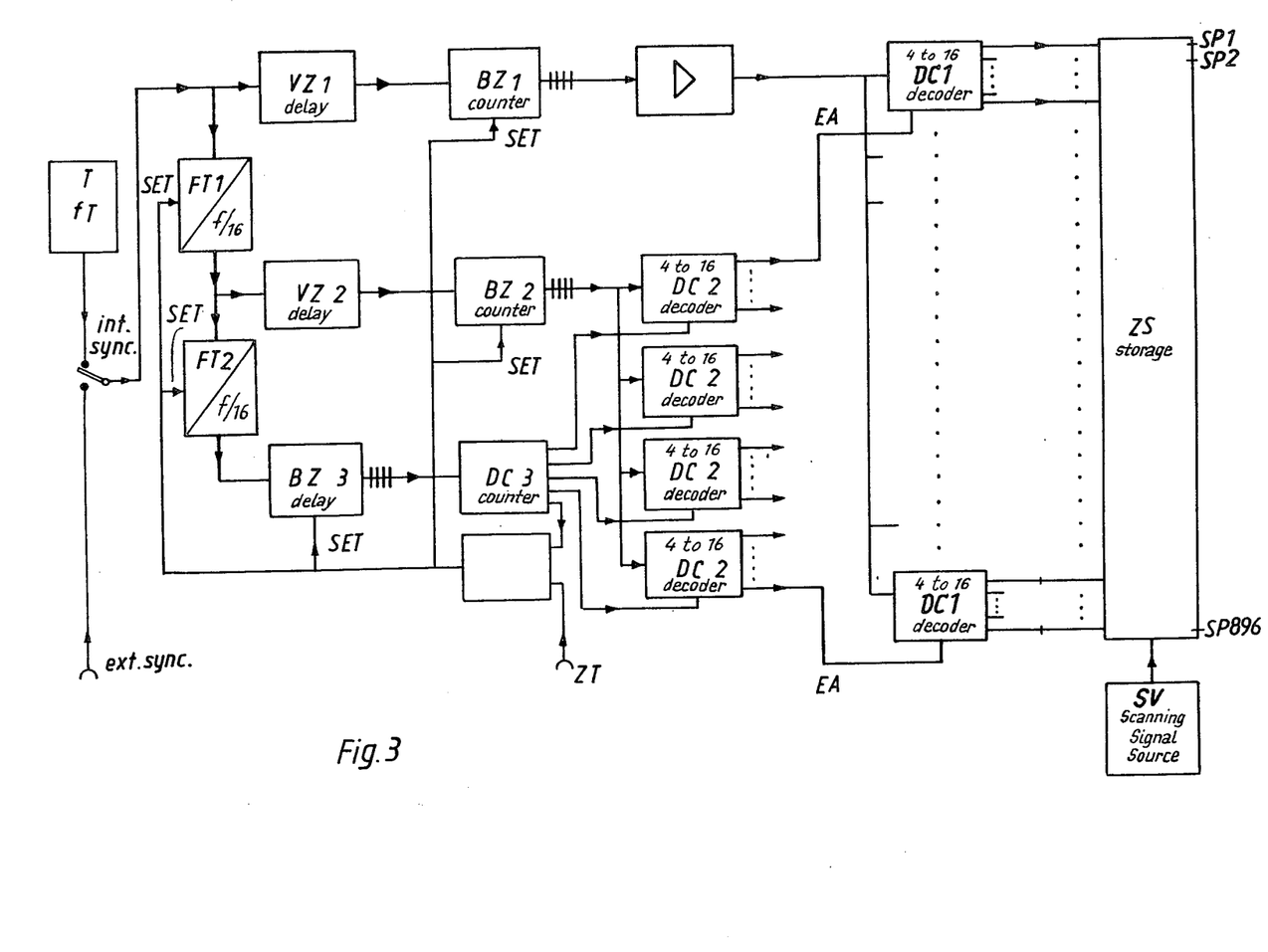
FIG. 3 is a block diagram of digital phase-shifting apparatus for regulating the positions of the reproduction in the direction perpendicular to the direction of transport.

The digital control arrangement shown in FIG. 3 has as its objective to connect each of these storage locations individually and in sequence to the signal source SV. The process takes place with a frequency $f_T$ which is either furnished by an internal synchronizing generator or by an external source.

Shown in FIG. 3 is a line trigger input ZT. The line trigger signal applied to input ZT causes counters BZ 1 and BZ 3 to be reset to the starting position. This causes the signal source SV to be connected to storage location $SP_1$ in ZS and thus to electrode $E_1$ which is assigned to this storage location. Upon receipt of the next synchronizing pulse, that is after time $1/f_T$, this connection is transferred to the storage location $SP_2$ and thus to electrode $E_2$. The process continues until the last storage location $SP_n$ is reached after which a line trigger pulse starts the next cycle by resetting the counters. A new cycle beginning with electrode $E_1$ can also be started earlier by an externally furnished line trigger pulse. In this case the last storage places and the electrodes associated therewith are not connected to SV. The ecording of the line is interrupted at an earlier instant.

FIG. 3 shows a circuit for a system having $n = 896$ electrodes. The synchronizing signal generator furnishes pulses having a frequency of $f_T$, which are applied to binary counter BZ 1 through a delay circuit VZ 1. Counter BZ 1 counts the pulses from 1 to 16 and furnishes binary coded signals corresponding to these numbers on four output lines. These coding output signals are amplified and applied to 56 decoders which are connected in parallel to each other. The decoders convert the signals in binary coded decimal form applied to their input to a 1 out of 16 code. In other words, the binary code signals are converted such that one line out of 16 is energized for each of the numbers 1 – 16 signified by the binary coded signals applied at the input. Thus, effectively for each of the first 16 synchronizing pulses received by counter BZ 1, one of lines 1 – 16 at the output of 56 decoders DC 1 is energized.

Thus, without additional circuitry, an output pulse appears on each of the 56 decoders DC 1 for each synchronizing pulse. This condition is suppressed by an enable input EA on each of the decoders. Only the one of the decoders which is receiving an enable pulse will transmit the synchronizing pulse. All the others are blocked.

For the first 16 synchronizing pulses, the enable pulse is applied to the one of the 56 decoders DC 1 shown at the top of FIG. 3. When the 17th pulse is received, the enable pulse is transferred from this decoder to a second decoder DC 1 which is not shown. For the 33rd synchronizing pulse the enable pulse is transferred from the second to the third decoder DC 1, etc. In general, whenever 16 synchronizing pulses have been applied to one of the decoder units DC 1, the enable pulse is transferred to the next subsequent one of these units.

In order to accomplish this, a pulse sequence having a frequency which is $1/16 \, f_T$ is derived from the synchronizing pulse sequence. In other words, the synchronizing pulse sequence is applied to a frequency divider whose ratio is 1/16. A shown in FIG. 3, the output of this frequency divider is applied through a delay unit VZ 2 to a binary counter BZ 2. The latter counts these pulses, each of which represents a group of 16 synchronizing pulses, and furnishes a counting signal corresponding to the number of so counted pulses in binary form on four output lines. These four output lines are symbolized by four vertical lines at the output of counter BZ 2 in FIG. 3. The four output lines are applied to four decoders, DC 2, all of which are connected in parallel with each other. Decoders DZ 2 decode the binary signals applied to their inputs in the same fashion as decoders DC 1. In other words, upon receipt of each pulse by counter BZ 2, another of the 16 output lines of each decoder unit DC 2 is energized. The outputs of the first one of the units DC 2 are connected to the enable inputs of the first 16 decoders DC 1. The output lines of the second decoder DC 2 control the enable inputs of the second group of 16 decoders DC 1, and so forth.

A further stage is now required in order to allow only one of the four decoders DC 2 to be enabled at any one time. Therefore each of the decoders DC 2 also has an enable input. A further stage is now required to enable each of the enable inputs of the decoders DC 2 in turn.

For this purpose, the pulse sequence whose frequency has already been divided by 16 is again divided by 16 in a frequency divider FT 2. Therefore only every 256th synchronizing pulse reaches the input of a counter BZ 3 which counts the pulses at the output of frequency divider FT. 2. Counter BZ 3 is also a binary counter having four output lines. These ouput lines are connected to the input of the decoder DC 3. Decoder DC 3 need have only four output lines. Each of the four output lines is energized in turn upon receipt of a pulse by counter BZ 3. The delay units VZ 1 and VZ 2 mentioned above are utilized in order to be certain that the correct enable pulses are present when the synchronizing pulses are received.

In the middle of FIG. 3 at the bottom an input ZT is shown at which the line trigger pulses are supplied. As mentioned previously a pulse applied at input ZT causes a resetting of counters BZ and the connection of storage location SP 1 in storage ZS to the processing unit SV which stores the signals resulting from the sampling of the original. The storage location SP 1 is of course connected to electrode $E_1$. The connection lasts approximately for the time required to sample the corresponding picture element in the original and, as described above, transfers with the synchronizing frequency $f_T$ from one electrode to the next and from the corresponding storage location in ZS to the next.

If now the line trigger pulse appears before the blanking interval in the scanning of the original has ended, then the scanning signal will be a zero signal and the electrode connected to the scanning signal source SV will not receive any charge. Therefore nothing will be entered upon the reproduction carrier. The time difference between the end of the line blanking interval associated with the scanning of the original and the line trigger pulse applied at terminal ZT of FIG. 3 thus determines which of electrodes $E_1 \ldots E_n$ will be the first to receive a signal different from zero. It is this time difference which therefore determines the position of the left edge of the copy relative to the line of electrodes.

In practice it is desirable that the phase of the horizontal deflection of the scanning of the original remains constant. Therefor the end of the line blanking interval remains fixed. Relative to these fixed values, it is now necessary to time the occurrence of the line trigger pulse. If this time delay between the appearance of the line trigger pulse and the end of the line blanking interval is measured in units of periods corresponding to the synchronizing frequency $f_T$, then a spacial displacement of the recording of a corresponding number of picture elements, that is, of a corresponding number of electrodes of the recording system, will take place. The horizontal position of the reproduction carrier relative to the first electrode is determined by the sensor HS (see FIGS. 2 and 4). The output of sensor HS is, in a preferred embodiment of the present invention, coded in such a manner that a single signal unit, such as a pulse or a voltage step, exactly corresponds to the distance between electrodes. The sensor HS thus furnishes a number of signal units $\bar{k}$:

$$\bar{k} = k + k^*$$

When the reproduction carrier is in the desired position, $k^* = 0$, and $\bar{k} = k$.

Figure 4:
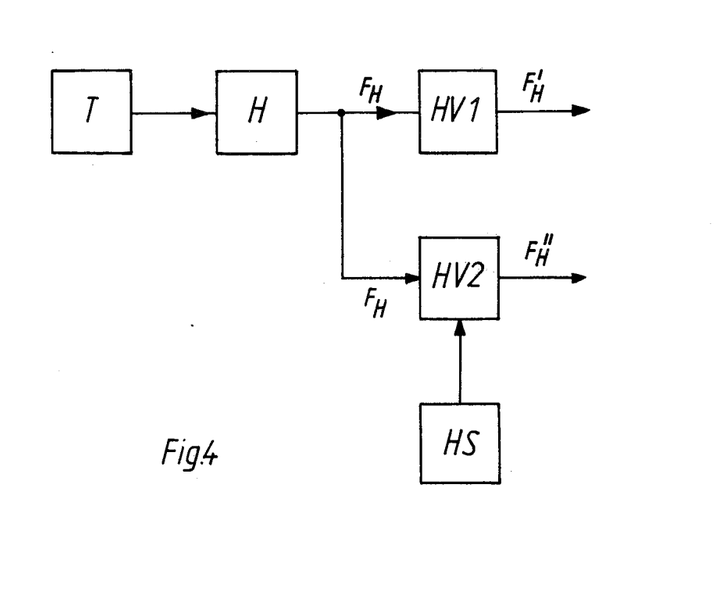
FIG. 4 is a further block diagram of the control arrangement for regulating the position of the color component image.
Figure 5:
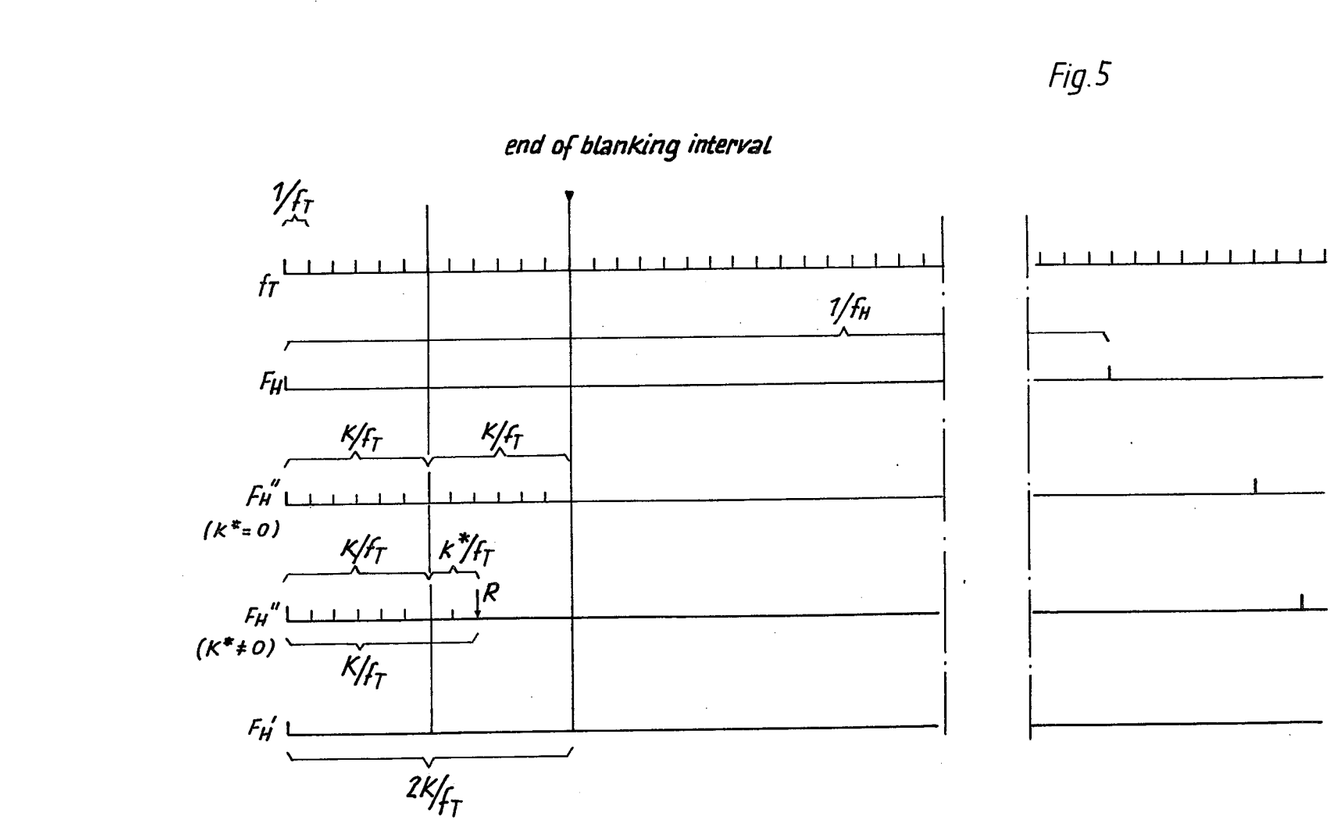
FIG. 5 is a timing diagram related to the apparatus shown in FIG. 4.

Fig. 4 shows the equipment required for effecting the time control, while FIG. 5 is a diagram showing the time relationship between the various pulses. A main oscillator T furnishes a frequency $f_T$ which, in a preferred embodiment of the present invention is 4.125 MHz. A pulse sequence $F_H$ having a line frequency $f_H$ is derived from oscillator T by frequency division in a frequency divider labeled H in FIG. 4. The phase of the pulse frequency $F_H$ is rigidly coupled to that of oscillator T. It is so chosen that the pulses from $F_H$ coincide in time with pulses of the synchronizing frequency.

A second pulse sequence $F_H{}'$ having line frequency $f_H$ is derived by delaying the sequence SH by a time period equal to $2k/f_T$. This pulse sequence which is delayed by a constant delay relative to the first pulse sequence controls the line deflection of the scanner of the original and thus controls the end of the line blanking interval. It therefore determines the start in time of the recording within a line. A third pulse sequence $F_H{}''$ also of frequency $f_H$ is then derived by delay of the first pulse sequence by a factor $\bar{k}/f_T$. This pulse sequence is applied at terminal ZT of FIG. 3; that is, it controls the time at which the first electrode is energized. As mentioned above, the value $\bar{k}$ is furnished by the sensor HS. Thus, as reference to FIG. 5 already shows, the use of pulses $F_H{}'$ to determine the end of the line blanking interval and the use of the pulses of the variable delay $F_H{}''$ to start the energization of electrodes recording the copy on the reproduction carrier will result in a correct positioning of the color component image in the horizontal direction.

The vertical positioning of the color component image, namely the positioning in the direction of transport of the reproduction carrier takes place by means of a regulating arrangement VV (FIG. 2) which is controlled by the vertical sensor VS which senses the vertical positon of the mark and in turn controls the vertical deflection of the scanning tube FS.

Since the velocity of transport of the reproduction carrier remains constant, the above described variations of the time of energization of the first electrode to effect the horizontal positioning will lead to a variation in the distance between lines of the reproduction carrier. Since, however, this regulation takes place before or during the rerording of the first line, it will not affect the geometry of the copy. The lines following the first line of course have a constant distance from each other. Further, the finished copies which result from the above-described electrostatic recording system are relatively insensitive to small variations in the distances between lines since the line structure perpendicular to transport direction is suppressed to a great extent.

Because of this suppression of the line structure perpendicular to the direction of transport, an absolutely exact registration of the individual lines of the different color component images is not essential. What is essential is the congruence of the picture content. Therefore the vertical deflection of the scanner of the original is triggered by the signal developed from sensor VS which senses the mark and is not modified with respect to the position of the first electrode to be energized. In the worst possible case this causes an eror of ½ of a line interval in the recorded raster. This error is not visible since the distance between electrodes from each other already lies within the maximum possible resolution of 10 lines per millimeter.

The above described control of the vertical positioning has the advantage of simplicity. However, the possibility exists that errors in the positioning of the original can also be compensated for by corresponding movement of the scanning raster.

Without further analysis, the foregoing will so fully reveal the gist of the present invention that other can, by applying current knowledge readily adapt if for various applications without omitting features that, from the standpoint of prior art, fairly constitute essential characteristics of the generic or specific aspects of this invention.

What is claimed as new and desired to be protected by Letters Patent is set forth in the appended claims.

1. In a method of forming a color image composed of at least three superimposed component images of different respective colors, in combination, the steps of transporting printing material along a predetermined path past at least three spaced successive printing stations, each printing station including a row of printing electrodes extending perpendicular to the printing material transport direction and operable for forming a latent image of a row of points corresponding to the row of electrodes, each printing station including means for converting the respective latent image into a corresponding visible component image of a respective color; scanning a line on a color original progressively proceeding from one end of the line to the other and generating for such line a first, a second and a third group of scanning signals indicative of the density of successive points of the progressively scanned line with respect to a first, a second and a third component color of the color original; at each printing station applying to the electrodes of the row of printing electrodes a group of activating signals corresponding to a respective one of said first, second and third groups of scanning signals and causing the electrodes of the row of printing electrodes to simultaneously with one another form upon the printing material a latent point image of a line corresponding to the line scanned on the color original; establishing registration of the point image of the scanned line produced at the second station with that produced at the first station by detecting a registration mark provided on the printing material and controlling the application of the activating signals to the electrodes of the row of electrodes at the second printing station in dependence upon such detection; and establishing registration of the point image of the scanned line produced at the third station with those produced at the first and second stations by detecting a registration mark provided on the printing material and controlling the application of the activating signals to the electrodes of the row of electrodes at the third printing station in dependence upon such detection.

2. The method defined in claim 1, further including the step of providing the registration mark on the printing material during travel of the latter along said path, the controlling of the application of the activating signals at the second and third printing stations being effected in dependence upon the detection of one and the same registration mark.

3. The method defined in claim 1, the printing stations being provided with control circuit means operative when triggered for correlating the scanning signals of each group of scanning signals with corresponding electrodes of a respective row of electrodes, the step of establishing registration at the second printing station and the step of establishing registration at the third printing station comprising regulating the location of the point images of the line corresponding to the scanned line in direction perpendicular to the printing material travel direction by varying the time of triggering of the control circuit means in dependence upon the registration mark detection to prevent the superimposed point images of the lines from being shifted relative to each other in direction perpendicular to the printing material travel direction.

4. The method defined in claim 1, the scanning of the line on the original being effected using a line-by-line scanning means having a vertical deflection trigger input, the establishing or registration at the second printing station and the establishing or registration at the third printing station comprising compensating for a tendency of the point images of the scanned line formed at the second and third printing stations to be formed offset relative to the point image of the scanned line formed at the first printing station in the direction of printing material travel by varying the time of application of trigger signals to the vertical deflection trigger input of the line-by-line scanning means in dependence upon registration mark detection.

5. The method defined in claim 1, each row of electrodes including a number of electrodes greater than the number of scanning signals in the respective group of scanning signals and greater than required for the formation on the printing material of the point image of the scanned line, the step of establishing registration at the second station and the step of establishing registration at the third station comprising compensating for a tendency for the point images of the scanned line formed at the three printing stations to be offset relative to one another in direction perpendicular to the printing material travel direction by changing in dependence upon registration mark detection the group of electrodes within the row of electrodes at the second and at the third station which receive activating signals.

6. The method defined in claim 5, the first, second and third printing stations being provided with analog buffer storage means, means for applying the scanning signals of each group of scanning signals signal-by-signal to the analog buffer storage means at a rate corresponding to the speed at which the line on the original is progressively scanned, means for causing the buffer storage means to apply the scanning signals stored therein as analog activating signals to the electrodes of the printing stations for a time interval corresponding to that required for the scanning of one line of the color original, and means for enabling the individual storage locations of the analog buffer storage means in succession for successive receipt of the scanning signals, the step of changing the electrodes within the row of electrodes at the second and at the third station which receive activating signals comprising advancing or delaying the enablement of the individual storage locations in dependence upon registration mark detection.

7. In an apparatus for forming a color image composed of at least three superimposed component images of different respective colors, in combination, means for transporting printing material along a predetermined path; at least three printing stations spaced along said path, each printing station including a row of printing electrodes extending perpendicular to the printing material travel direction and operable for forming upon the printing material a latent image of a row of points corresponding to the row of electrodes, each printing station furthermore including means for converting the respective latent image into a corresponding visible component image of a respective color; scanning means operative for scanning a line on a color original progressively proceeding from one end of the line to the other and for generating for such line a first, a second and a third group of scanning signals indicative of the density of successive points of the progressively scanned line with respect to a first, a second and a third component color of the color original; means operative for applying to the electrodes of the row of printing electrodes at each printing station in group of activating signals corresponding to a respective one of said first, second and third groups of scanning signals and causing the electrodes of the row of printing electrodes to simultaneously with one another from upon the printing material a latent point image of a line corresponding to the line scanned on the color original; registration-establishing means for establishing registration of the point image of the scanned line produced at the second station and that produced at the third station with each other and with that produced at the first station by detecting a registration mark provided on the printing material and controlling the application of the activating signals to the electrodes of the row of electrodes at the second and third printing stations in dependence upon such registration mark detection.

8. The apparatus defined in claim 7, the first printing station including means for forming a registration mark on the printing material.

9. The apparatus defined in claim 7, the registration-establishing means including photoelectric detecting means for detecting registration marks provided on the printed material.

10. The apparatus defined in claim 7, the scanning means comprising a line-by-line scanner having a vertical deflection trigger input, the registration-establishing means including means for compensating for a tendency for the point image of the scanned line formed on the printing material at the first, second and third stations to be improperly offset in direction of printing material travel by varying the time of application of trigger signals to the vertical deflection trigger input of the line-by-line scanner in dependence upon the registration mark detection.

11. The apparatus defined in claim 7, each row of electrodes including a number of electrodes greater than the number of scanning signals in the respective group of scanning signals and greater than required for the formation on the printing material of the point image of the scanned line, the registration-establishing means including means for compensating for a tendency of the point images of the scanned line formed at the second and third stations to be offset relative to each other and to that formed at the first station in direction perpendicular to printing material travel by changing in dependence upon registration mark detection the group of electrodes within the row of electrodes at each of the second and third printing stations which receive activating signals corresponding to the scanning signals.

12. The apparatus defined in claim 1, the printing stations being provided with analog buffer storage means comprised of a number of storage locations corresponding to the total number of printing electrodes in one row or printing electrodes, means for applying the scanning signals of each group of scanning signals signal-by-signal to the analog buffer storage means at a rate corresponding to the speed at which the line on the original is progressively scanned, means for causing the buffer storage means to apply the scanning signals stored therein as analog activating signals to the electrodes of the printing stations for a time interval corresponding to that required for the scanning of one line of the color original, means for enabling the individual storage locations of the analog buffer storage means in succession for successive receipt of the scanning signals, the means for changing the group of electrodes within the row of electrodes at the second and third stations which receive activating signals comprising means for advancing and delaying the enablement of the individual storage locations in dependence upon registration mark detection.

* * * * *